United States Patent Office 3,375,127
Patented Mar. 26, 1968

3,375,127
PLASMA ARC SPRAYING OF HAFNIUM OXIDE
AND ZIRCONIUM BORIDE MIXTURES
Clarence Howard Mellor, Saxonville, Mass., assignor to
Fenwal Incorporated, Ashland, Mass., a corporation of
Massachusetts
No Drawing. Continuation-in-part of application Ser. No.
264,206, Mar. 11, 1963. This application Feb. 19, 1964,
Ser. No. 345,837
9 Claims. (Cl. 117—93.1)

This application is a continuation-in-part of my application Ser. No. 264,206, filed on March 11, 1963, for Thermocouple, and now abandoned.

My invention relates to protective coatings for use at high temperatures. In particular, my invention concerns plasma arc sprayed mixtures of hafnium oxide and zirconium diboride to provide a protective coating in oxygen rich atmospheres at temperatures above 2500° C.

High melting point refractory materials such as pure metals, oxides, carbides, borides, silicides, nitrides, etc. have been considered for use alone and together with various binders as protective coatings. Refractory metal thermocouples of molybdenum, tungsten and their rhenium alloys require protective coatings when employed at tempertaures of about 2500 to 3000° C. or higher and especially when used in oxidizing atmospheres such as in oxygen-rich flames of a liquid oxygen-kerosene rocket engine. The protective coating employed should not have excessive bulk or thickness to unduly lower the response time of the thermocouple, and yet must provide protection for a sufficient period of time to enable a proper temperature measurement. The coating should thus inhibit oxidation of the base material, be relatively thin to permit good response time, and should have good adherence characteristics.

The base material to be protected at high temperatures is often a metal or metal alloy or a combination thereof having a particular function such as a thermocouple function, or may be graphite, vitreous, or other material used to coat nuclear rod or pellet fuel elements. The base material surface is preferably homogeneous to provide one coeffcent of expansion, but may also be nonhomogeneous and contain two or more base elements where their coefficient of expansions are similar. The protective coating should have a similar coefficient of expansion as the surface to be protected; otherwise on subsequent heating or cooling the coating tends to flake or crack due to the stresses created by the resulting unequal expansion or contraction.

A desirable protective coating would be one which would have a life of at least three minutes in an oxygen rich oxyacetylene flame of about 3000° C. Further, a coating which would be capable of reuse for more than one heating-cooling cycle or at least more than a one-shot protective coating, would permit the same thermocouple or coating to be again employed for reproducibility experiments and lower the replacement cost of the protected article.

It is, therefore, an object of my invention to provide a rare earth oxide-refractory metal boride protective coating capable of providing protection at high temperatures or in oxidizing atmospheres.

It is a further object of my invention to provide a protective coating for refractory metal substrates which permit their use in more than one heating-cooling cycle.

Additional objects and advantages of my invention will be apparent to those skilled in the art from the following detailed description of my invention.

I have found that a mixture of hafnium oxide and zirconium diboride plasma arc sprayed onto a refractory metal substrate provides excellent protection against the deterioration of the substrate at temperatures of 2500 to 3000° C. or more and in oxygen rich flames. The spraying of a relatively thin coating of the order of 2 to 50 thousandths of an inch in thickness onto a homogeneous tungsten thermocouple surface provided good protection and gave a coating which did not flake or crack on subsequent cooling and reheating.

One of the difficulties in employing high melting point materials for coating purposes is that often the materials are polymorphic undergoing changes in structure at various temperature levels below their melting point with accompanying changes in volume and expansion characteristics which create internal stresses, cracks, fissures, etc. and degrade the mechanical strength and protective properties of the coating. For example, hafnium oxide is polymorphic and has a transformation point with a change in volume at about 1800° C. It has a monoclinic and tetragonal lattice structure isomorphous with zirconium oxide. Thus, although hafnium oxide is a high melting point (about 2777° C.) material and relatively impervious to the inward movement of oxygen to the substrate and to the outward migration of substrate metal oxides, its transformation well below its melting point renders it unsuitable for high temperature protective coatings. I have found thta hafnium oxide can be admixed with alkaline earth oxides like calcium oxide and zirconium oxide to give a composition of 84.5% HfO, 10.5% $ZrO_2$, and 5.0% CaO which provides good protection. But, the calcium oxide which stabilizes the expansion characteristics of hafnium oxide also depresses its melting point excessively to permit the mixture to be employed as a high temperature protective coating.

Zirconium diboride having a melting point of about 3040° C. is not totally stable, but oxidizes very slowly up to about 2800° C. and then oxidizes rapidly to its melting point. The oxides formed at these temperatures have different linear thermal expansion coefficients than zirconium diboride, so that oxidizing protection above 2800° C. is not obtained, while subsequent cooling promotes cracking and flaking of the coating. Zirconium oxide at about 1000° C. changes from the monoclinic form to the tetragonal form accompanied by about a 9% volume decrease. Thius, neither hafnium oxide nor zirconium diboride alone provide a suitable protective coating.

I have found that powdered mixtures of these materials may be stabilized by spray coating the mixtures in a plasma arc to provide condensed coating materials on base metals such as thermocouple probes of sufficient thickness and density to inhibit oxidation of the substrate for prolonged periods of time, and to permit more than one heating and cooling cycle of the coating at temperatures of about 2500–3000° C. The mixture of hafnium oxide and zirconium diboride spray coated in a plasma arc does not depress the melitng point to preclude the use of this mixture for a coating.

A suitable mixture for spray coating in a plasma arc includes, but is not limited to: a mixture of hafnium oxide and zirconium diboride in a 1:1 atomic ratio based on the metal. As the amount of hafnium oxide is increased above this ratio there is a tendency for the coating to expand too quickly and crack. Mixture of 1:1 $HfO/ZrB_2$ shows good oxidation resistance characteristics and the coating adheres firmly to the substrate material.

Suitable mixtures include those powdered admixtures of HfO and $ZrB_2$ wherein the $HfO/ZrB_2$ ratio is 1:1 or less, with a particle size distribution of between about −125 and +325 mesh and an average particle size of about 200 mesh found to work well. Of course, if desired the proper mixture of materials may be fed into the plasma arc in any convenient physical form such as in wire form.

The plasma arc apparatus and operation is well known to those skilled in the art as is set forth in U.S. Patent 2,806,124, U.S. Patent 2,858,411, and in Industrial and Engineering Chemistry 55 #1 16–23 (January 1963). Plasma arc spraying is accomplished by employing an inert carrier gas such as air, nitrogen, or argon in which is dispersed the powdered mixture to be sprayed. The material is carried through an electrical discharge created by an electric arc which is typically at a temperature of 3000° K. or 5000° K. or higher or sufficiently high to create an ionized gas or vapor of the materials; that is above the melting point of the materials to create a stream of molten particles in an ionized gas or above the ionizing potential or temperature of one or more of the materials to create a wholly or partially ionized gaseous stream.

The plasma jet resulting from the arc discharge is an ionized gaseous mixture, which is typically characterized as a hot, fluid, gaseous stream capable of conducting electricity. Although electrical plasma arcs are described, any method which creates an ionized gaseous stream of the materials can be employed in preparing our coating. The plasma arc jet is directed towards the substrate to be coated, while the high temperature substrate to be coated is surrounded by an atmosphere of an inert cooling gas stream such as argon. Thus three gaseous streams are usually employed in a plasma arc operation which may be the same or a different gas; an arc gas, a carrier gas, and a cooling gas. The arc gas can be a heat source such as argon or helium or a reactive gas like hydrogen or oxygen. The electrodes used can be nonconsumable or consumable like carbon direct current electrodes. The plasma jet stream then condenses on the cooled substrate surface to provide the desired protective coating. Although the exact nature of the hafnium oxide-zirconium diboride coating condensed on the substrate surface is unknown, it is believed that the condensed hafnium oxide may exist in the stable cubic form.

The substrate to be coated with my protective coating may be any material capable of being cooled to a temperature sufficiently low so that condensation of the plasma jet stream will not appreciably damage the surface. Commonly, most materials suitable for coating or base materials will include high melting point metals, metal alloys, vitreous and ceramic materials like clays, porcelain, metal silicates, or oxides, etc., high melting point plastics, graphite and the like.

An application of particular utility includes the coating of metal rods, probes, wires, and cylinders of thermocouples. Another application includes the protective coating of rods or pellets of radioactive materials such as uranium and plutonium-containing nuclear fuel elements which require operation at high temperature for prolonged periods of time.

*Example I*

A tungsten rod was sandblasted using iron grit, solvent degreased, and the rod then cleaned in an acid dip to prepare the surface for a plasma arc coating. A plasma arc apparatus with a plasmadyne S-series hand spray gun and employing argon as the inert arc, carrier, and cooling gas was used to create a hot plasma jet stream. A mixture of 1:1 hafnium oxide and zirconium diboride powder of −150 to +325 mesh was placed in a powder hopper having a venturi opening and carried into the carbon direct current electrode arc by a stream of argon. Typical settings employed for spraying this mixture are:

Current _____amps__ 600–650
Arc gas flow _____ [1] 1.1
Powder gas flow _____ [1] 0.7

[1] Relative scale divisions of a rotometer flow tube S–50–1.

The hand nozzle from which the plasma jet stream emerged was moved slowly across the surface of the tungsten rod at a distance of about two to eight inches to create a dense uniform condensed coating of about 7 to 10 thousandths of an inch. A stream of cooling arc gas was blown across the tungsten surface during the spraying operation. Upon cooling of the coated rod it was then tested by placing the coated end of the rod in an oxyacetylene flame adjusted to burn at about 3000° C. Similarly tungsten rods were sprayed with zirconium diboride, however, zirconium diboride coatings in thicknesses of up to 0.020″ failed either before a temperature of 2800° C. was reached or before an exposure time of three minutes elapsed.

Hafnium oxide plasma sprayed coatings while giving good protection were suitable for only one heating-cooling cycle.

A mixture of $ZrB_2$ and $HfO_2$ withstood temperature of 4700° F. for five minutes with no apparent damage to the substrate. Exposure at 3700° C. for one half hour gave no apparent damage. The temperature was then increased until the coating began to melt above 5000° F.

The $HfO_2$-$ZrB_2$ plasma sprayed coatings not only gave protection at these elevated temperatures, but on cooling showed no visible evidence of flaking or cracking of the coating and permitted these coatings to undergo subsequent heating and cooling cycles.

Tungsten-tungsten-26% rhenium high temperature thermocouples coated with this protective coating have good response times and are protected from oxidation in oxygen-rich flames at high temperatures.

A protective coating has thus been taught which coating when the molten particle of hafnium oxide and zirconium diboride are sprayed on a cool substrate at high temperatures above the melting point of these substances in an ionized gas stream yields coatings of enhanced oxidizing resistance, improved high temperature properties and capable of more than a single heating-cooling cycle. The unique materials prepared in the plasma arc may be, if desired, ground up and prepared in paste form with suitable low melting point binders like silicates, oxides, etc. for use as coatings, ceramics, catalyst supports, insulation, etc.

What I claim is:

1. A method of preparing a high temperature oxidation resistant coating material which comprises: introducing a mixture of hafnium oxide and zirconium boride into a high temperature plasma arc at a temperature above the melting point of the mixture to form an ionized plasma arc jet stream, said mixture consisting of not more than about 50 atomic percent, based on the metal, of hafnium oxide and the amount of hafnium oxide being sufficient to form with the zirconium diboride an oxidation resistant protective coating capable of more than one heating-cooling cycle at 3000° C. for three minutes; and thereafter condensing this stream in a nonoxidizing atmosphere and recovering the condensed material.

2. A method as defined in claim 1 wherein the mixture is a mixture of about 1:1 hafnium oxide to zirconium boride.

3. A method as defined in claim 1 wherein the mixture is a powdered mixture of between −125 to +325 mesh introduced into the gas by an inert carrier gas.

4. A method as defined in claim 1 wherein the nonoxidizing atmosphere is argon.

5. A method of preparing a high temperature oxidation resistant protective coating capable of more than one heating-cooling cycle at 3000° C. for three minutes which method comprises: introducing a mixture of 1:1 hafnium oxide and zirconium boride into an electrical discharge plasma arc in conjunction with an inert gas stream, said arc having a temperature above the melting point of the mixture materials to create a high temperature ionized plasma arc jet stream; spraying and condensing the plasma arc stream on a relatively cool base substrate in an inert atmosphere to form a protective coating of sufficient thickness to provide high temperature protection at temperatures of between 2500–3000° C.

6. The method as defined in claim 5 wherein the coating thickness is from 0.002 to 0.050 inch in thickness.

7. The method as defined in claim 5 wherein the substrate is a refractory metal.

8. The method as defined in claim 5 wherein the substrate is tungsten.

9. A coated article comprising a base substrate and a protective coating of hafnium oxide and zirconium boride prepared in accordance with the method of claim 5.

References Cited

UNITED STATES PATENTS

| 2,972,529 | 2/1961 | Alexander et al. | 75—176 |
| 3,179,782 | 4/1965 | Matvay | 219—75 X |

FOREIGN PATENTS 901,784  7/1962  Great Britain.

OTHER REFERENCES

Loch, "Chemical Engineering," vol. 65, June 30, 1958, pp. 105 to 109.

ALFRED L. LEAVITT, *Primary Examiner.*

RICHARD D. NEVIUS, *Examiner.*

A. GOLIAN, *Assistant Examiner.*